United States Patent [19]

Takasaki et al.

[11] 3,909,922
[45] Oct. 7, 1975

[54] CONTROL SYSTEM FOR PLURAL NUMERICALLY CONTROLLED MACHINE TOOLS

[75] Inventors: Akira Takasaki, Toyota; Yoshio Shima, Obu; Takehiko Hayashi, Toyota, all of Japan

[73] Assignee: Toyoda Koki Kabushiki Kaisha, Japan

[22] Filed: July 23, 1973

[21] Appl. No.: 381,625

[30] Foreign Application Priority Data
Aug. 1, 1972   Japan................................ 47-77407

[52] U.S. Cl......................... 29/563; 29/568; 408/3
[51] Int. Cl.²......................................... B23Q 41/02
[58] Field of Search.......... 29/563, 568, 33 P; 408/3

[56] References Cited
UNITED STATES PATENTS

| | | | |
|---|---|---|---|
| 3,543,392 | 12/1970 | Perry et al. | 29/563 |
| 3,576,540 | 4/1971 | Fair et al. | 408/3 UX |

*Primary Examiner*—Donald R. Schran
*Assistant Examiner*—Z. R. Bilinsky
*Attorney, Agent, or Firm*—Oblon, Fisher, Spivak, McClelland & Maier

[57] ABSTRACT

A control system for plural numerically controlled machine tools comprising a main conveyor and a buffer conveyor for transferring a plurality of work pallets accorded with coded numbers. The buffer conveyor has a plurality of buffer areas. A plurality of machining modules classified by machining processes are arranged in association with buffer areas of the buffer conveyor. A plurality of rails arranged above the machining modules extend transversely of the main and buffer conveyors with a pallet transfer device suspended by each rail for selectively transferring the work pallets into its associated buffer area and main conveyor and for selectively transferring the work pallets from the associated buffer area into the associated machining module in response to the coded numbers on the work pallets. At least one of the machining modules includes not less than two numerically controlled machine tools performing the same function arranged along the rail. A central control device is provided for transmitting information to each numerically controlled machine tool in accordance with the coded number of the work pallet transferred in the machine tool.

3 Claims, 8 Drawing Figures

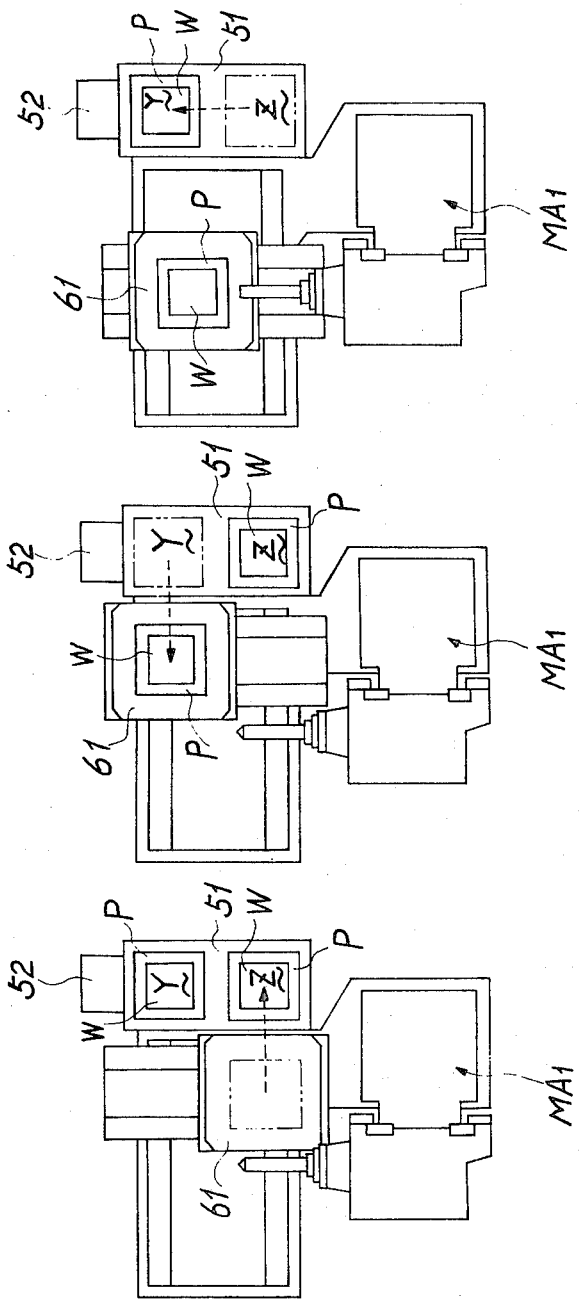

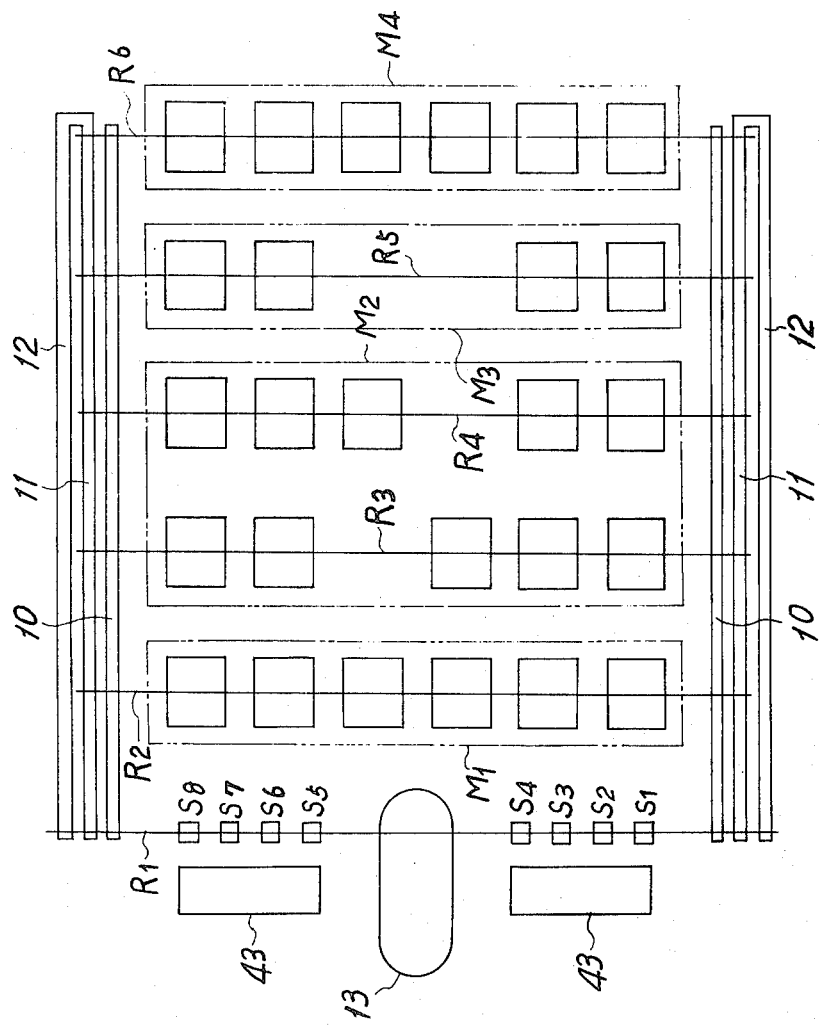

CONTROL SYSTEM FOR PLURAL NUMERICALLY CONTROLLED MACHINE TOOLS

BACKGROUND OF THE INVENTION

1. Field of the Invention

The present invention relates to an overall control system for controlling a plurality of numerically controlled machine tools and a conveyor system interconnecting the machine tools by using a computer as a central control device.

2. Description of the Prior Art

Conventional control systems for plural numerically controlled machine tools have been well known and have been somewhat successful. However, since prior art systems have not been constructed to include machining modules which are classified by machining processes, there has been difficulty in the flexibility of such systems, thus increasing down time. Furthermore, it has been somewhat difficult to expand prior art systems.

SUMMARY OF THE INVENTION

It is therefore an object of the present invention to provide an improved control system for plural numerically controlled machine tools, by which a better flexibility for system-down-time, a higher rate of system operation, and an easier expansion of the system can be obtained such that productive management from a small production rate to an intermediate production rate, in accordance with a production schedule, can be easily performed by computer management.

Another object of the present invention is to provide an improved control system for plural numerically controlled machine tools comprising a plurality of machining modules classified by machining processes, at least one of the modules including not less than two numerically controlled machine tools performing the same function.

Another object of the present invention is to provide an improved control system for plural numerically controlled machine tools wherein a main conveyor and a buffer conveyor are arranged in parallel relation for effectively transferring a plurality of work pallets.

BRIEF DESCRIPTION OF THE DRAWINGS

The foregoing and other objects of the present invention will be more fully appreciated as the same becomes better understood from the following detailed description of the preferred embodiments, when considered in connection with the accompanying drawings in which:

FIGS. 5, 6 and 7 are schematic plan views showing various positions of pallets relative to a machine tool; and FIG. 8 is a schematic plan view showing another embodiment of a control system.

DETAILED DESCRIPTION OF THE PREFERRED EMBODIMENTS

Figure 1:
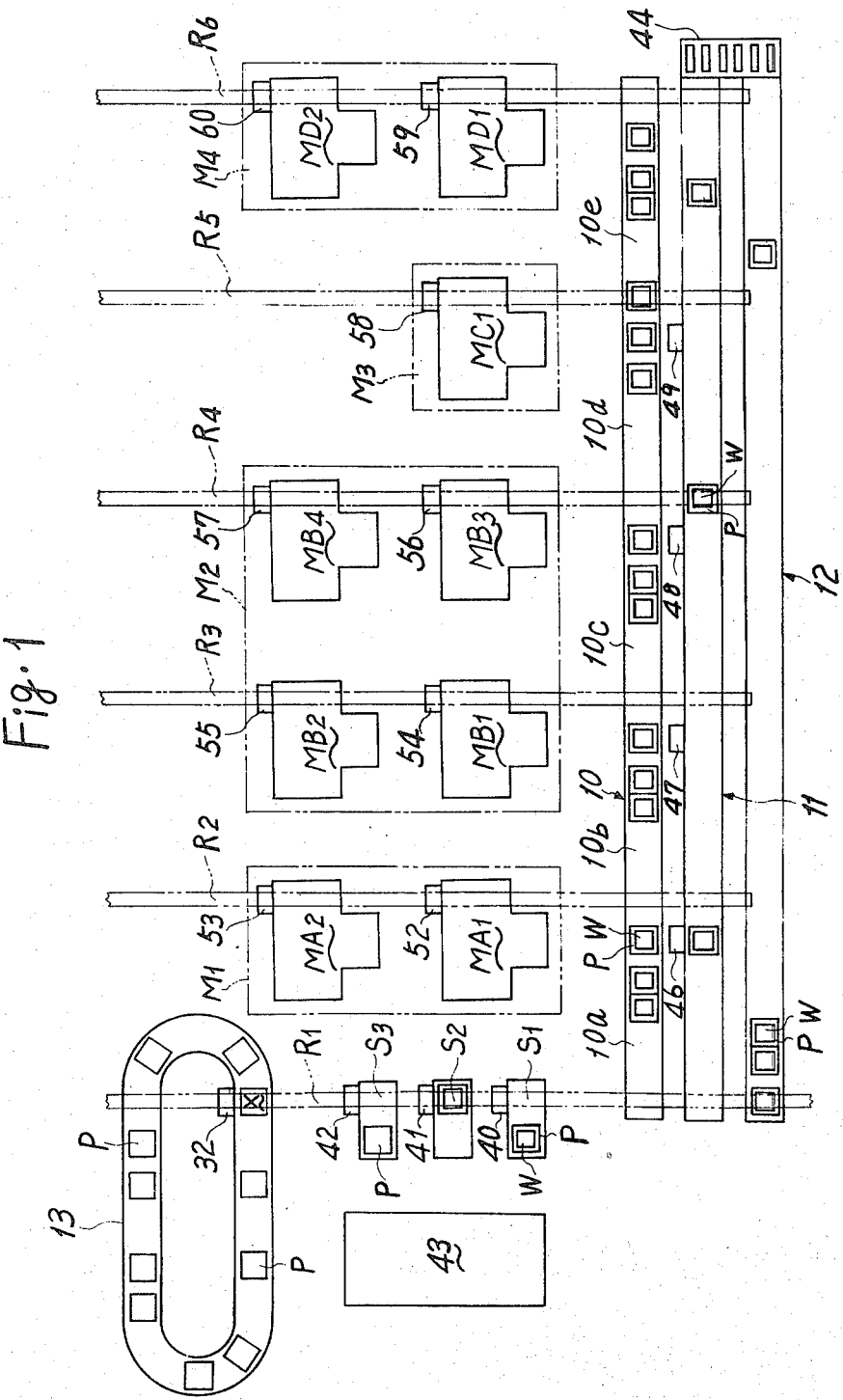
FIG. 1 is an overall schematic plan view of a control system for numerically controlled machine tools.

Referring now to the drawings, wherein like reference characters refer to identical or corresponding parts throughout the several views, there is shown in FIG. 1 a buffer conveyor 10, a main conveyor 11 and a return conveyor 12 for transferring a plurality of pallets P disposed in parallel relation with each other. A plurality of rails R1 to R6 are installed above and transversely of the conveyors 10, 11 and 12 with a certain amount of distance separating the rails. Under the first rail R1, there is disposed a pallet pool 13 in the form of a loop for storing a plurality of pallets P. A predetermined number of loading and unloading stations S1 to S3 for loading and unloading a variety of workpieces W on the pallets P is also positioned below rail R1. Under the second to sixth rails, R2 to R6, there are arranged a plurality of numerically controlled machine tools MA1 to MD2, each having an automatic tool change function. Four numerically controlled machine tools MB1 to MB4, with the same mechanical construction, are arranged along the third and fourth rails R3 to R4 for performing drill operations and define a module M2 for drilling operations. In the same manner, a single numerically controlled machine tool MC1 is arranged under the fifth rail R5 for performing a tapping operation and defines a module M3 for a tapping operation. Further, two numerically controlled machine tools MD1 and MD2 are arranged along the sixth rail R6 for performing fine boring operations and define a module M4 for fine boring operations. The number of machine tools for performing different machining operations may be added along each of the rails R2 to R6 in accordance with a production schedule. Moreover, when many machine tools are needed for a particular machining operation, the arrangement may be made in the same manner as the module M2 wherein four numerically controlled machine tools MB1 to MB4 are arranged in parallel relation along the rails R3 and R4.

The buffer conveyor 10 is divided by the rails R1 to R6 into a plurality of buffer areas 10a to 10e, as shown in FIG. 1. In the first buffer area 10a, pallets P carrying workpieces W to be operated in the module M1 are transferred from the loading and unloading stations S1 to S3, as described hereinafter. Likewise, pallets P carrying workpieces W to be operated in the Module M2 are transferred in the second and third buffer areas 10b and 10c from the main conveyor 11. Pallets P carrying workpieces W to be operated in the module M3 and pallets P carrying workpieces W to be operated in the Module M4 are transferred in the fourth and fifth buffer areas 10d and 10e, respectively. Detecting means not shown, are provided in each of the buffer areas 10b and 10c for detecting the number of pallets P carried therein for the operation in the module M2. In response to signals from the detecting means, pallets P are selectively transferred into the buffer areas 10b and 10c for balancing the number of the pallets in each of the buffer areas 10b and 10c.

Figure 3:
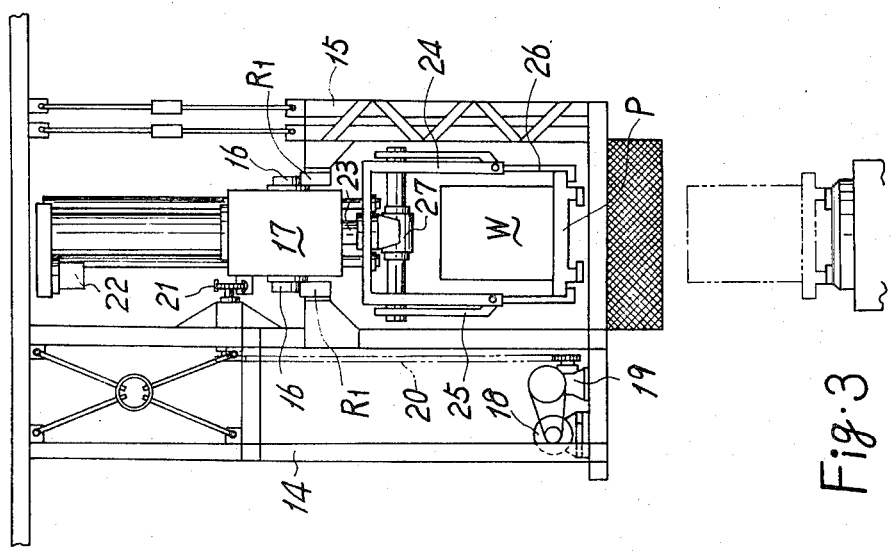
FIG. 3 is a sectional view of a pallet transfer device.

Referring now to FIG. 3, the first rail R1 is mounted on support frames 14 and 15 suspended from the ceiling. A pallet transfer device 17 is supported on the rail R1 through rollers 16. Connected with the transfer device 17 is a chain 21 which is driven by a motor 18 mounted on the support frame 14 through a reduction gear 19 and a transmission mechanism 20, such that energization of the motor 18 causes the transfer device 17 to run along the rail R1. A supporting shaft 23 which is moved vertically by actuation of a motor 22 is held by the transfer device 17. A bifurcated block 24 fixed to the lower end of the supporting shaft 23 supports a pair of pivotal arms 25 and 26. Arms 25 and 26 are opened and closed by actuation of a motor 27 to release and hold the pallet P with the workpiece W. Each of the rails R2 to R6 is also provided with a pallet transfer device which is similar to the device 17 of the first rail R1.

Figure 2:
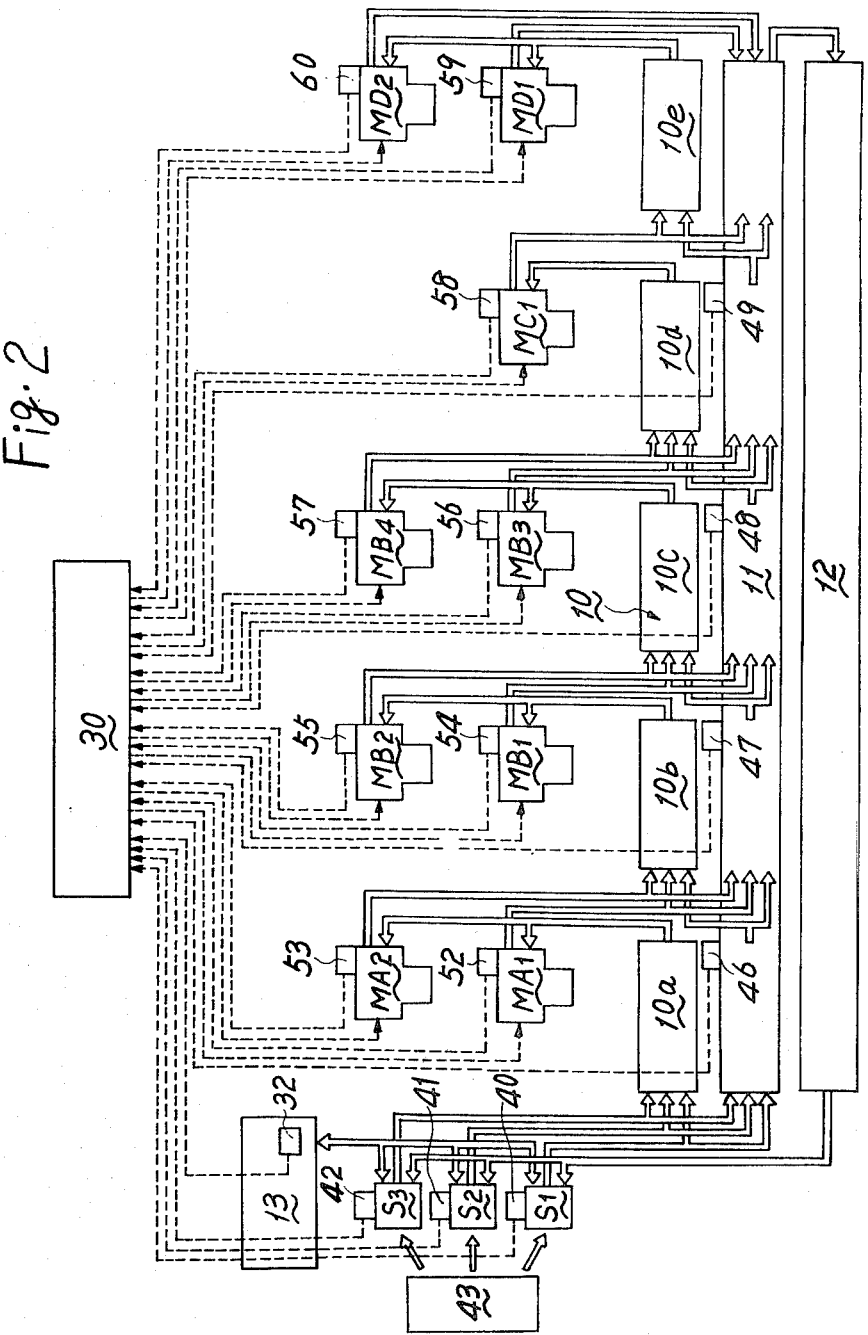
FIG. 2 is a schematic diagram showing a flow of pallets and signal transmission in relation thereto.

As schematically shown in FIG. 2, the transfer device 17 supported by the first rail R1 transfers pallets P between the pallet pool 13 and loading and unloading stations S1 to S2 and between the loading and unloading stations S1 to S3 and the conveyors 10, 11 and 12. The transfer device supported by each of the rails R2 to R6 transfers pallets between the buffer conveyor 10 and the main conveyor 11 and between the conveyors 10 and 11 and each of the machine tools. Machining data for each of the machine tools and data for the destination of pallets are memorized in a central control device 30 which mainly consists of a mini-computer. Transmission of the data and control signals is performed between the central control device 30 and machine tools and other control elements.

Figure 4:
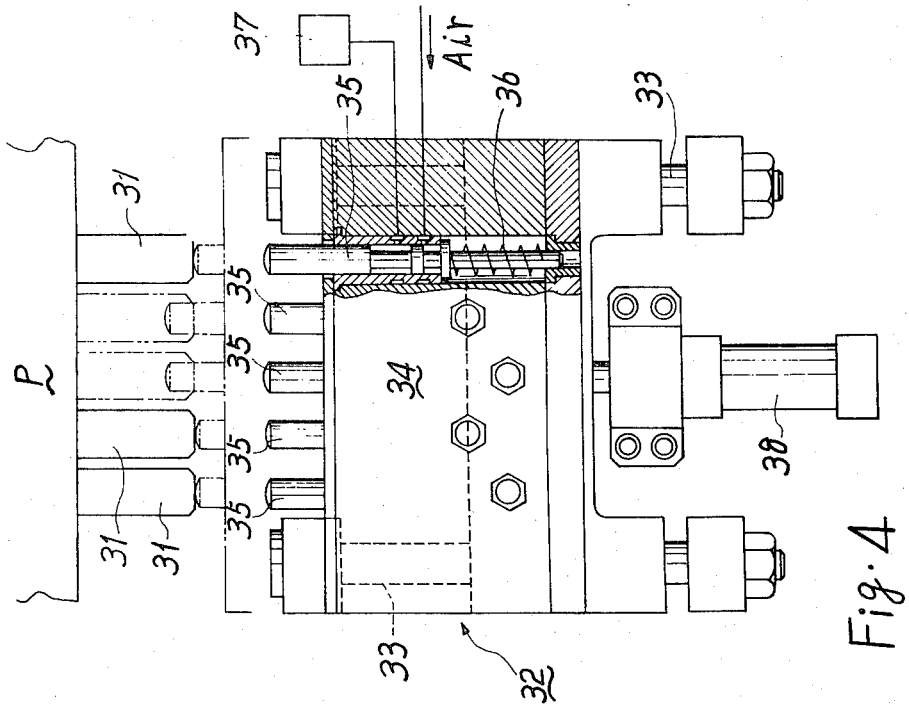
FIG. 4 is a plan view, partly in section, showing a pallet identification device.

A plurality of pallets P are stored in the pallet pool 13 and one side of each pallet P detachably supports five dogs 31, as shown in FIG. 4. The dogs constitute a binary coded arrangement so that each pallet may be identified. One of the five dogs 31 is used for a parity check and the other dogs are used for identification of each pallet. The pallet pool 13 is provided with a position "X" under the first rail R1, as shown in FIG. 1, from which position each pallet is carried out or returned back. Each pallet on the pallet pool 13 is successively indexed into the position X where a pallet identification device 32 identifies the pallet number thereof.

An example of the pallet identification device is shown in FIG. 4. A head 34 is movably supported by guide shafts 33 and five rods 35 are slidably received in the head 34 in such a manner that each rod 35 is normally held in advanced position by means of a spring 36 to close communication between an air source and an associated pressure detecting device 37. When the head 34 is advanced toward the pallet in the position X by actuation of a hydraulic cylinder 38, a predetermined number of rods 35 contact with the associated dogs 31 supported by the pallet, the rods are then retracted backwards against the respective springs 36 such that communication between the air source and the respective pressure detecting devices 37 are established to actuate the pressure detecting devices 37 thereby to identify the pallet number of the pallet. The pallet to be carried out from the pallet pool 13 is designated by the mini-computer of the central control device with the pallet number and is indexed to the position X where the pallet number is identified by the pallet identification device 32. The pallet identified by the identification device 32 is selectively transferred by the transfer device 17 supported by the first rail R1 into the loading and unloading stations S1 to S3.

At the loading and unloading stations S1 to S3, pallet identification devices 40 to 42 similar to the device 32 are arranged to indicate the number of the pallet transferred thereinto. An operator selects a workpiece associated with the indicated pallet number from a work pool 43 and loads the same on the indicated pallet at the loading and unloading stations S1 to S3. The pallet number identified by one of the pallet identification devices 40 to 42 is transmitted to the mini-computer which determines whether or not the workpiece on the pallet is to be machined in the first module M1 for milling and rough boring operation.

A driving circuit, not shown, for the transfer device 17 is controlled in response to the determination of the mini-computer such that the transfer device 17 selectively transfers the pallet P from the loading and unloading stations S1 to S3 to the first buffer area 10a of the buffer conveyor 10 and the main conveyor 11. More particularly, when the mini-computer determines that the workpiece W on the pallet P is to be machined in the first module M1, the pallet is transferred into the buffer area 10a of the buffer conveyor 10. In another case, the pallet is transferred to the main conveyor 11, bypassing the buffer area 10a. A pallet with a workpiece on which all machining operations have been completed in the machining modules is transferred from the main conveyor 11 through a roller conveyor 44 to the return conveyor 12 and is then transferred back to the loading and unloading stations S1 to S3 by the transfer device 17 supported on the first rail R1. The operator then unloads the finished workpiece from the pallet transferred into the loading and unloading stations S1 to S3. The pallet from which the finished workpiece has been unloaded is returned back to the position X on the pallet pool 13 to be stored therein by the transfer device 17.

In the main conveyor 11, pallet identification devices 46 to 49 having substantially the same construction as the device 32 are respectively provided ahead of the rails R2 to R6 for identifying the pallet number passing therethrough.

The pallet number identified by each of the identification devices 46 to 49 is transmitted to the mini-computer which in turn controls the destination of the pallet. More particularly, when the pallet P on the main conveyor 11 is transferred just ahead of the second rail R2, the pallet number is identified by the pallet identification device 46 which transmits the identity of the pallet to the mini-computer. The mini-computer then determines whether or not the workpiece on the pallet is to be machined in the module M2 for drilling operations. When the mini-computer determines that the workpiece on the pallet is to be machined in the module M2, the pallet is stopped by stop means, not shown, under either the second rail R2 or third rail R3. Then, the pallet is selectively transferred from the main conveyor 11 to either the second buffer area 10b or the third buffer area 10c of the buffer conveyor 10 by means of the transfer device supported either by the second rail R2 or by the third rail R3. When the mini-computer determines that the workpiece is not to be machined in the module M2, the pallet is continuously transferred on the main conveyor, bypassing the second and third buffer areas 10b and 10c.

These controls are performed in the other pallet identification devices 48 and 49 in a similar manner. For example, whether or not the workpiece on the pallet is to be machined in the module M3 and whether or not the workpiece is to be machined in the module M4 are determined ahead of the fourth and fifth rails R4 and R5, in response to the pallet number identified by the identification devices 48 and 49, respectively.

Only when the workpiece is to be machined in the module M3 or M4 will the pallet P with the workpiece be transferred from the main conveyor 11 to the buffer conveyor 10 and then moved into the module M3 or M4 through the buffer area 10d or 10e of the buffer conveyor 10.

As shown in FIG. 5, in the machine tool MA1 of the module M1, there is provided a support base 51 which defines a pallet loading and unloading position "Y" and an intermediate position "Z". The pallet transfer device on the second rail R2 is adapted to transfer the pallet P with the workpiece to be machined in the machine tool MA1 from the buffer area 10a into the loading-unloading position Y and to transfer the pallet with the workpiece which has been machined from the loading-unloading position Y into either the buffer conveyor 10 or main conveyor 11. On the support base 51 of the machine tool MA1, there is provided a pallet-identification device 52 similar to the device 32 for identifying the number of the pallet transferred to the loading-unloading position Y.

The pallet number identified by the identification device 52 is transmitted to the mini-computer of the central control device 30 which selects a machining program corresponding to the pallet number from the data stored therein. When a predetermined machining operation is performed on the workpiece on the pallet mounted on a work table 61 of the machine tool MA1, the work table 61 is shifted to a position adjacent to the intermediate position Z on the support base 51 and then the pallet P is transferred to the intermediate position Z, as shown in FIG. 5. When the pallet is transferred to the intermediate position Z, the work table 61 is moved along the support base 51 to a position adjacent to the loading-unloading position Y. A pallet P with a workpiece W to be next machined by the machine tool MA1 is transferred from the position Y to the work table 61, and the workpiece is precisely positioned and then clamped, as shown in FIG. 6. A machining program selected by the mini-computer is then transmitted to the machine tool MA1 for controlling the same to machine the workpiece W.

The pallet P which has been transferred to the intermediate position Z is shifted into the loading-unloading position Y, as shown in FIG. 7, wherein the pallet number is again identified by the identification device 52 which is transmitted to the mini-computer. The mini-computer determines whether or not the workpiece on the pallet is to be machined in the succeeding module. The pallet moved to the position Y is selectively transferred by the transfer device either to the buffer conveyor 10 or to the main conveyor 11, depending upon the determination of the mini-computer. For example, if the mini-computer determines that the pallet from the module M1 is to be transferred to the succeeding module M2, the pallet is transferred into the buffer conveyor 10. On the other hand, if the pallet from the module M1 is not to be transferred to the succeeding module M2, the pallet is transferred into the main conveyor 11, bypassing the module M2.

As described above, when the pallet P is moved out from the machining module M1 by the transfer device and then selectively transferred either to the buffer conveyor 10 or to the main conveyor 11, one of the pallets P aligned on the buffer area 10a is indexed under the rail R2 and transferred to the machine tool MA1 by the transfer device to be positioned in the loading-unloading position Y on the support 51. While the above description has been made in accordance with the particular machine tool MA1 referring to FIGS. 5 to 7, it is to be understood that the same control is applied to the other machine tools MA2 to MD2, such that machine tools MA2 to MD2 are provided with respective identification devices 53 to 60.

In a control for the transfer of the pallets, a priority order effective to the machining efficiency is determined over the whole transfer line and the mini-computer controls such priority order.

Referring to FIG. 6, showing another embodiment of the present invention, many machine tools are arranged in series in each of modules M1 to M4. Pairs of buffers, main conveyors and return conveyors 10, 11, and 12 are arranged in parallel with each other in opposite sides of modules. A plurality of rails R1 to R6 are disposed which extend transversely of conveyors 10, 11 and 12. Each of rails R1 to R6 is provided with two transfer devices, not shown, for effectively transferring the work pallets.

As described above, since the control system of the present invention is constructed by machining modules classified by machining processes and at least one of the modules includes more than two numerically controlled machine tools performing the same function, a better flexibility for the system down time, a higher rate of system operation and an easier expansion of the system in accordance with a change in production schedule can be obtained.

It is possible according to the present invention that when a pallet is to be transferred to a machining module, such as a module for a tapping operation or fine boring operation, which is located remote from the loading station, that the pallet can be directly transferred from the loading station to a predetermined position near the module without the necessity of identification of the pallet number at intermediate positions on the main conveyor.

It is also possible according to the present invention that when a particular workpiece is to be machined without following the priority order, a pallet with the particular workpiece may be directly transferred from the main conveyor to a machine tool without use of the buffer conveyor.

Obviously, many modifications and variations of the present invention are possible in light of the above teachings. It is therefore to be understood that within the scope of the appended claims, the invention may be practiced otherwise than as specifically described herein.

We claim:

1. A control system for plural numerically controlled machine tools comprising:

main conveyor means for transferring in one direction a plurality of work pallets each being accorded with a coded number;

buffer conveyor means movable in the same direction as said main conveyor and having a plurality of buffer areas each being disposed in parallel relation with and adjacent to said main conveyor means;

a plurality of machining modules each including at least one numerically controlled machine tool and classified by a machining process in association with each buffer area of said buffer conveyor means;

a plurality of rails each arranged above the respective machining module and extending above and transversely of said main and buffer conveyor means;

pallet transfer means suspended by each of said rails for selectively transferring said work pallets into the associated buffer area and main conveyor means and for selectively transferring said work pallets from the associated buffer area into the associated machining module in response to the coded numbers on said work pallets such that a preselected priority pallet can be transferred directly from said main conveyor to a preselected machining module in order to by-pass any pallets on said buffer conveyor means;

each of said machine tools being provided with a support base for exchanging said work pallet between the machine tool and said pallet transfer means associated therewith;

at least one of said machining modules including not less than two numerically controlled machine tools each provided with an automatic tool change device and performing the same machining operation in the classified machining process and arranged along said rail; and a central control device for transmitting information to each of said numerically controlled machine tools in accordance with the coded number of the work pallet transferred in the machine tool.

2. A control system for plural numerically controlled machine tools comprising:

a main conveyor for transferring in one direction a plurality of work pallets each being accorded with a coded number;

a buffer conveyor movable in the same direction as said main conveyor and having a plurality of buffer areas each being disposed in parallel relation with and adjacent to said main conveyor;

a plurality of machining modules each including at least one numerically controlled machine tool and classified by a machining process in association with each buffer area of said buffer conveyor and arranged in opposite side of said buffer conveyor relative to said main conveyor;

a plurality of rails each arranged above the respective machining module and extending above and transversely of said main and buffer conveyors;

a pallet transfer device suspended by each of said rails for selectively transferring said work pallets into the associated buffer area and main conveyor and for selectively transferring said work pallets from the associated buffer area into the associated machining module in response to the coded numbers on said work pallets such that a preselected priority pallet can be transferred directly from said main conveyor to a preselected machining module in order to by-pass any pallets on said buffer conveyor means;

each of said machine tools being provided with a support base for exchanging said work pallet between the machine tool and said pallet transfer device associated therewith;

at least one of said machining modules including not less than two numerically controlled machine tools each provided with an automatic tool change device and performing the same machining operation in the classified machining process and arranged along said rail; and a central control device for transmitting information to each of said numerically controlled machine tools in accordance with the coded number of the work pallet transferred in the machine tool.

3. A control system for plural numerically controlled machine tools comprising:

a pair of main conveyors for transferring in one direction a plurality of work pallets each being accorded with a coded number;

a pair of buffer conveyors each movable in the same direction as said main conveyor and each having a plurality of buffer areas and disposed inside of said pair of main conveyors in parallel relation therewith and adjacent thereto;

a plurality of machining modules each including at least one numerically controlled machine tool and classified by a machining process in association with each buffer area of said buffer conveyors and arranged between said pair of buffer conveyors;

a plurality of rails each arranged above the respective machining module and extending above and transversely of said pair of main and buffer conveyors;

a pair of pallet transfer devices suspended by each of said rails for selectively transferring said work pallet into the associated buffer area and main conveyor and for selectively transferring said work pallets from the associated buffer area into the associated machining module in response to the coded numbers on said work pallets such that a preselected priority pallet can be transferred directly from said main conveyor to a preselected machining module in order to by-pass any pallets on said buffer conveyor means;

each of said machine tools being provided with a support base for exchanging said work pallet between the machine tool and said pallet transfer device associated therewith;

at least one of said machining modules including not less than two numerically controlled machine tools each provided with an automatic tool change device and performing the same machining operation in the classified process and arranged along said rail; and a central control device for transmitting information to each of said numerically controlled machine tools in accordance with the coded number of the work pallet transferred in the machine tool.

* * * * *